US011860659B2

(12) United States Patent
Choi et al.

(10) Patent No.: US 11,860,659 B2
(45) Date of Patent: Jan. 2, 2024

(54) LOW DROP-OUT (LDO) LINEAR REGULATOR

(71) Applicant: SK hynix Inc., Gyeonggi-do (KR)

(72) Inventors: Joongho Choi, Seongnam-si (KR); Minsu Park, Seoul (KR); Jiteck Jung, Seongnam-si (KR); Seungwoo Shin, Seoul (KR); Chankyu Bae, Goyang-si (KR); Kibaek Kwon, Seoul (KR); Myunsik Kim, Seoul (KR); Jiwon Son, Cheongju-si (KR); Heain Kim, Guri-si (KR)

(73) Assignee: SK hynix Inc., Gyeonggi-do (KR)

( * ) Notice: Subject to any disclaimer, the term of this patent is extended or adjusted under 35 U.S.C. 154(b) by 107 days.

(21) Appl. No.: 17/562,277

(22) Filed: Dec. 27, 2021

(65) Prior Publication Data

US 2022/0206521 A1 Jun. 30, 2022

(30) Foreign Application Priority Data

Dec. 29, 2020 (KR) ........................ 10-2020-0186682

(51) Int. Cl.
*G05F 1/575* (2006.01)

(52) U.S. Cl.
CPC .................................... *G05F 1/575* (2013.01)

(58) Field of Classification Search
CPC . G05F 1/575; G05F 1/585; G05F 1/59; G05F 1/571; G05F 1/573
See application file for complete search history.

(56) References Cited

U.S. PATENT DOCUMENTS

| | | | | |
|---|---|---|---|---|
| 6,977,490 B1 * | 12/2005 | Zhang | G05F 1/575 323/280 |
| 8,547,077 B1 * | 10/2013 | Chang | G05F 1/575 323/275 |
| 2003/0214275 A1 * | 11/2003 | Biagi | G05F 1/575 323/280 |

FOREIGN PATENT DOCUMENTS

KR 10-2017-0008416 A 1/2017

OTHER PUBLICATIONS

Mohammad Al-Shyoukh et al., "A Transient-Enhanced Low-Quiescent Current Low-Dropout Regulator With Buffer Impedance Attenuation", IEEE Journal of Solid-State Circuits, vol. 42, No. 8, pp. 1732-1742, Aug. 2007.
Marco Ho et al., "A Low-Power Fast-Transient 90-nm Low-Dropout Regulator With Multiple Small-Gain Stages" IEEE Journal of Solid-State Circuits, vol. 45, No. 11, p. 2466-2475, Nov. 2010.

(Continued)

*Primary Examiner* — Nguyen Tran
(74) *Attorney, Agent, or Firm* — IP & T GROUP LLP

(57) ABSTRACT

A low drop-out (LDO) linear regulator includes: a pass transistor coupled between an input terminal and an output terminal; an error amplifier suitable for amplifying and outputting a difference between a feedback voltage corresponding to an output voltage of the output terminal and a predetermined reference voltage; a buffer including an input terminal which is coupled to an output node of the error amplifier and an output terminal which is coupled to a gate of the pass transistor; a first compensation circuit suitable for driving an equivalent resistance of the output node of the error amplifier to be in inverse proportion to a load current; and a second compensation circuit suitable for driving an equivalent resistance of an output node of the buffer to be in inverse proportion to the load current.

10 Claims, 14 Drawing Sheets

(56) References Cited

OTHER PUBLICATIONS

Chaitanya K. Chava et al., "A Frequency Compensation Scheme for LDO Voltage Regulators", IEEE Transactions On Circuits and Systems—I: Regular Papers, vol. 51, No. 6, pp. 1041-1050, Jun. 2004.
Gabriel A. Rincon-Mora et al.,"Optimized Frequency-Shaping Circuit Topologies for LDO's", IEEE Transactions on Circuits and Systems—II: Analog and Digital Signal Processing, vol. 45, No. 6, pp. 703-708, Jun. 1998.
Ka Nang Leung et al., "A Capacitor-Free CMOS Low-Dropout Regulator With Damping-Factor-Control Frequency Compensation" IEEE Journal of Solid-State Circuits, vol. 38, No. 10, pp. 1691-1702, Oct. 2003.
Sai Kit Lau et al., "A Low-Dropout Regulator for SoCWith Q-Reduction" IEEE Journal of Solid-State Circuits, vol. 42, No. 3, pp. 658-664, Mar. 2007.
Office Action issued by the Korean Intellectual Property Office dated Jan. 26, 2022.

* cited by examiner

COMP1, 2

LOW DROP-OUT (LDO) LINEAR REGULATOR

CROSS-REFERENCE TO RELATED APPLICATIONS

The present application claims priority of Korean Patent Application No. 10-2020-0186682, filed on Dec. 29, 2020, which is incorporated herein by reference in its entirety.

BACKGROUND

1. Technical Field

Exemplary embodiments of the present invention relate to a low drop-out (LDO) linear regulator.

2. Description of the Related Art

FIG. 1 is a circuit diagram illustrating a low drop-out (LDO) linear regulator circuit utilizing a general equivalent series resistance (ESR).

In the LDO linear regulator circuit shown in FIG. 1, a large output capacitor CL may be used for a stable output voltage. Accordingly, a dominant pole may be created at an output terminal in terms of frequency. Also, a pole may be formed at an output node of an error amplifier 11. The pole of the output node of the error amplifier 11 may be positioned relatively close to the dominant pole due to a large output resistive component $R_{EA}$ of the error amplifier 11 and a large gate capacitance component $C_{gpp}$ of a pass transistor $M_{pp}$ for driving a load current.

FIGS. 2A and 2B are Bode diagrams of an inner loop gain of an LDO linear regulator.

Referring to FIG. 2A, as the pole $\omega_{p2}$ is positioned closer to the origin than a unity gain frequency $\omega_0$ in terms of frequency, unstable operation may be caused. In order to solve this problem, as shown in FIG. 2B, the pole of the output node of the error amplifier may be compensated by adjusting the equivalent series resistance ESR of the output capacitor $C_L$ to place LHP (Left Half Plane) zero $\omega_Z$ on the Bode diagram.

However, since ESR is a resistive component formed in series with the load capacitor, it is difficult to specify a value for accurate compensation. Therefore, LHP zero based on ESR may cause an unstable operation in a loop depending on its position in terms of frequency.

FIGS. 3A and 3B are Bode diagrams when the loop operation is unstable due to the position of LHP zero in terms of frequency.

Referring to FIG. 3A, when the ESR is too large, the pole based on parasitic components on the circuit other than the above-mentioned pole and dominant pole may be positioned at a frequency smaller than a unit gain frequency. This may make a phase margin small and cause unstable operation.

Referring to FIG. 3B, when ESR is too small, LHP zero may be positioned at a frequency higher than the unit gain frequency, and since the two poles are positioned before the unit gain frequency, unstable operation may be caused. For this reason, when frequency compensation is performed using ESR, reliable stability may not be acquired.

SUMMARY

Embodiments of the present invention are directed to a low drop-out (LDO) linear regulator that may provide a stable power supply operation even at a high load current.

In accordance with an embodiment of the present invention, a low drop-out (LDO) linear regulator includes: a pass transistor coupled between an input terminal and an output terminal; an error amplifier suitable for amplifying and outputting a difference between a feedback voltage corresponding to an output voltage of the output terminal and a predetermined reference voltage; a buffer including an input terminal which is coupled to an output node of the error amplifier and an output terminal which is coupled to a gate of the pass transistor; a first compensation circuit suitable for driving an equivalent resistance of the output node of the error amplifier to be in inverse proportion to a load current; and a second compensation circuit suitable for driving an equivalent resistance of an output node of the buffer to be in inverse proportion to the load current.

DETAILED DESCRIPTION

Figure 1:
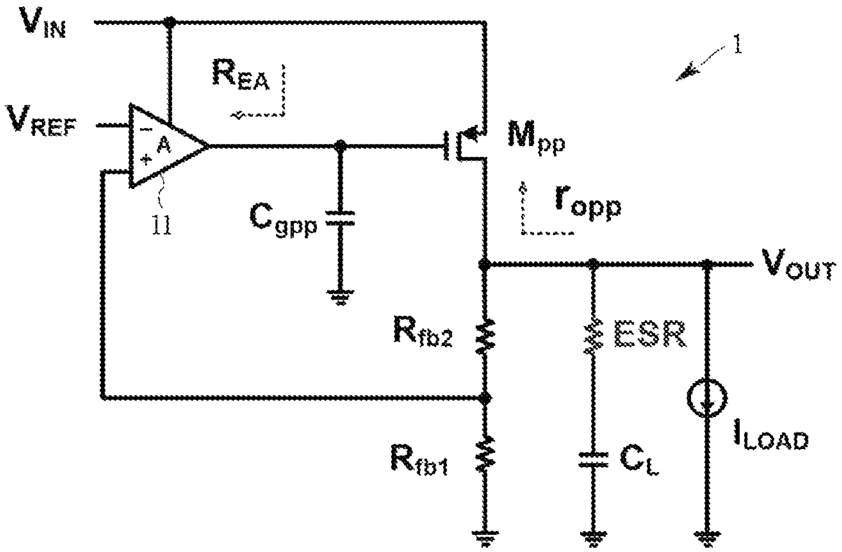
FIG. 1 is a circuit diagram illustrating a low drop-out (LDO) linear regulator circuit utilizing a general equivalent series resistance (ESR).
Figure 2B:
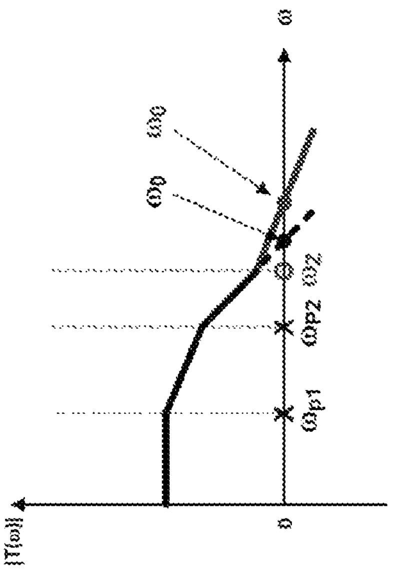
FIGS. 2A to 3B are Bode diagrams of an inner loop gain of an LDO linear regulator.
Figure 2A:
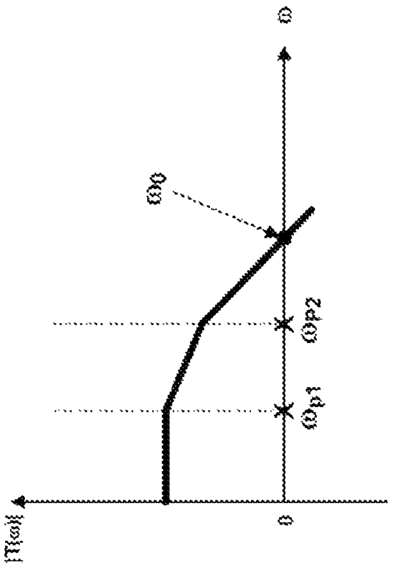
Figure 3A:
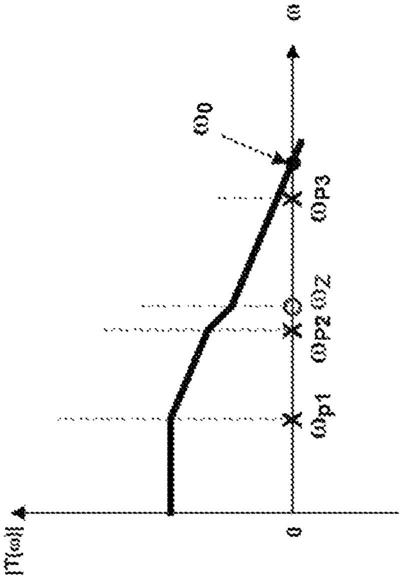
Figure 3B:
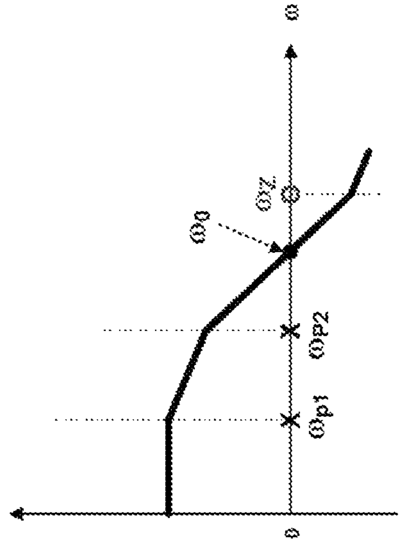

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

By adding a buffer between a pass transistor and an error amplifier of a low drop-out (LDO) linear regulator circuit, frequency compensation may be performed in a loop operation of the LDO linear regulator.

Figure 4:
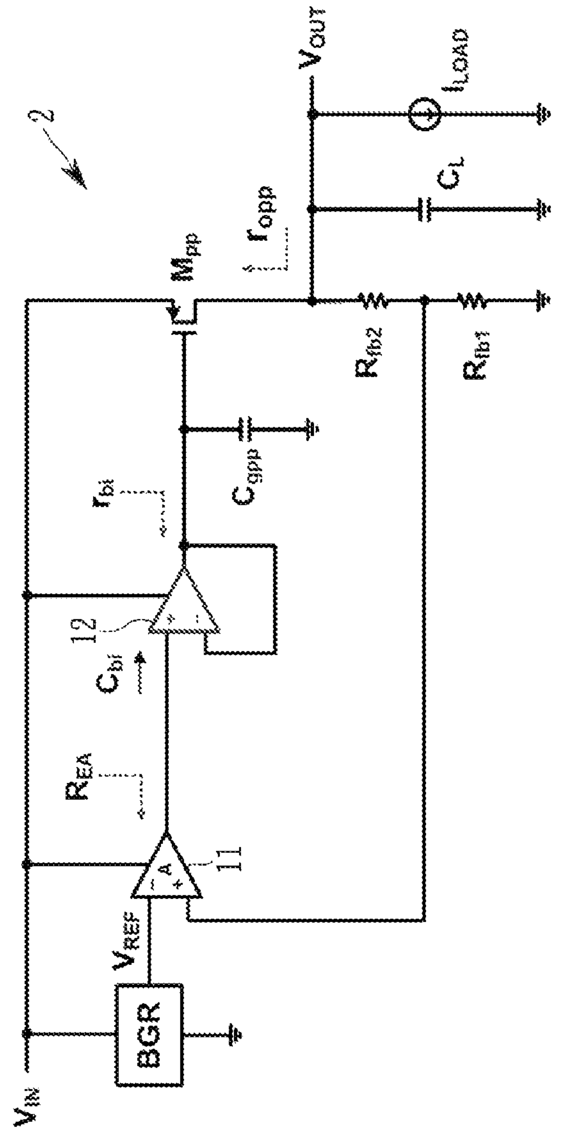
FIG. 4 is a circuit diagram illustrating a structure of an LDO linear regulator with a buffer added thereto.

FIG. 4 is a circuit diagram illustrating a structure of the LDO linear regulator with a buffer added thereto.

Referring to FIG. 4, when the buffer 12 is added, the pole which is considered at the output node of the existing error amplifier 11 may be divided into two poles. The pole may be analyzed based on the equivalent resistance and capacitance at each node, and the pole at the output node of the error amplifier 11 may be determined based on an output resistance REA of the error amplifier 11 and the capacitance $C_{bi}$ of the output node, and the pole at a gate node of a pass transistor $M_{pp}$ may be determined based on a transconductance rbi of a differential input transistor of the buffer 12 and a gate capacitance of the pass transistor.

Figure 5:
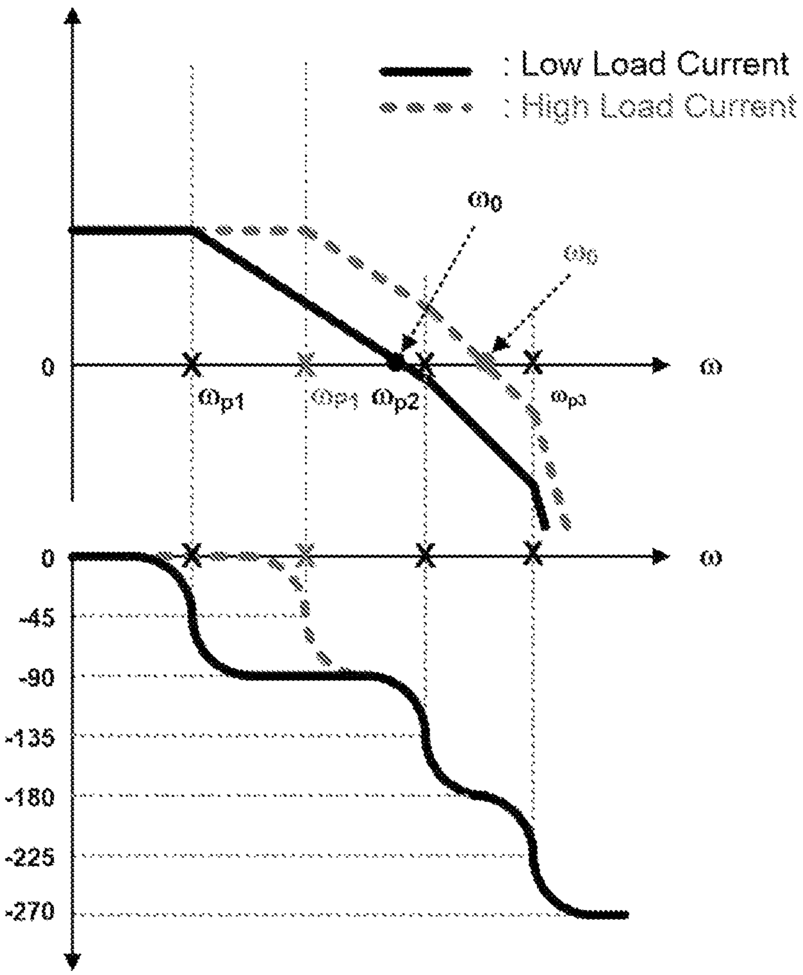
FIG. 5 is a Bode diagram of the inner loop gain of the LDO linear regulator shown in FIG. 4.

FIG. 5 is a Bode diagram of the inner loop gain of the LDO linear regulator shown in FIG. 4.

Referring to FIG. 5, since the two poles $\omega_{p2}$ and $\omega_{p3}$ of a low load current are positioned at a much higher frequency than the poles when the buffer is not used, only the dominant pole exists within the unit gain frequency ω0. Therefore, it is possible to perform a relatively stable operation without using ESR. However, when a high load current is output, the operation of the regulator may not be stable in response to an instant change in the load current. Since the equivalent resistance ropp of the output node is in inverse proportion to the load current, the dominant pole may move to a higher frequency in proportion to the increase in the load current. On the other hand, since the two poles at the node of the input/output terminals of the buffer 12 hardly change with respect to an increase in the load current, when the load current increases, the dominant pole and the two poles may become closer in frequency.

In other words, at a predetermined level of the load current or higher, two or more poles may exist within the unit gain frequency, which causes the loop to have a low phase margin, causing unstable operation of the regulator. Therefore, additional compensation is required to drive a high load current.

The LDO linear regulator according to an embodiment of the present invention may provide a stable operation of the regulator even at a high load current by connecting a compensation circuit to each of the input terminal and the output terminal of the buffer. The LDO linear regulator according to an embodiment of the present invention may include a compensation circuit implementing a compensation method for driving a high current in a regulator structure using a buffer.

Hereinafter, the embodiments of the present invention disclosed in the present specification will be described in detail with reference to the accompanying drawings, but the same or similar reference numerals are given to the same or similar components, and repeated descriptions on the same or similar components will be omitted. The terms "module" and/or "part" for the components used in the following description are given or used together in consideration of only the ease of writing the specification, and do not have distinctive meanings or roles by themselves. Also, in describing the embodiments of the present invention disclosed in the present specification, if it is considered that detailed descriptions of related known technologies may obscure the gist of the embodiments of the present invention disclosed in the present specification, the detailed description thereof will be omitted. In addition, the accompanying drawings are not restrictive but illustrative only to help understand the embodiments of the present invention disclosed in the present specification, and the technical idea disclosed herein is not limited by the accompanying drawings, and all changes included in the spirit and scope of the present invention should be understood to include equivalents or substitutes.

Terms including an ordinal number such as first, second, etc. may be used to describe diverse components, but the components are not limited by the terms. The above terms are used only for the purpose of distinguishing one component from another.

When a component is referred to as being "coupled" or "connected" to another component, it may be directly coupled or connected to the other component, but other components may exist in between. On the other hand, when it is mentioned that a certain element is "directly coupled" or "directly connected" to another element, it should be understood that no other element is present in between.

In the present patent application, terms such as "comprises" or "have" are intended to designate that the features, numbers, steps, operations, components, parts, or combinations thereof described in the specification exist, and it should be understood that this does not preclude the possibility of addition or presence of one or more other features or numbers, steps, operations, components, parts, or combinations thereof.

Figure 6:
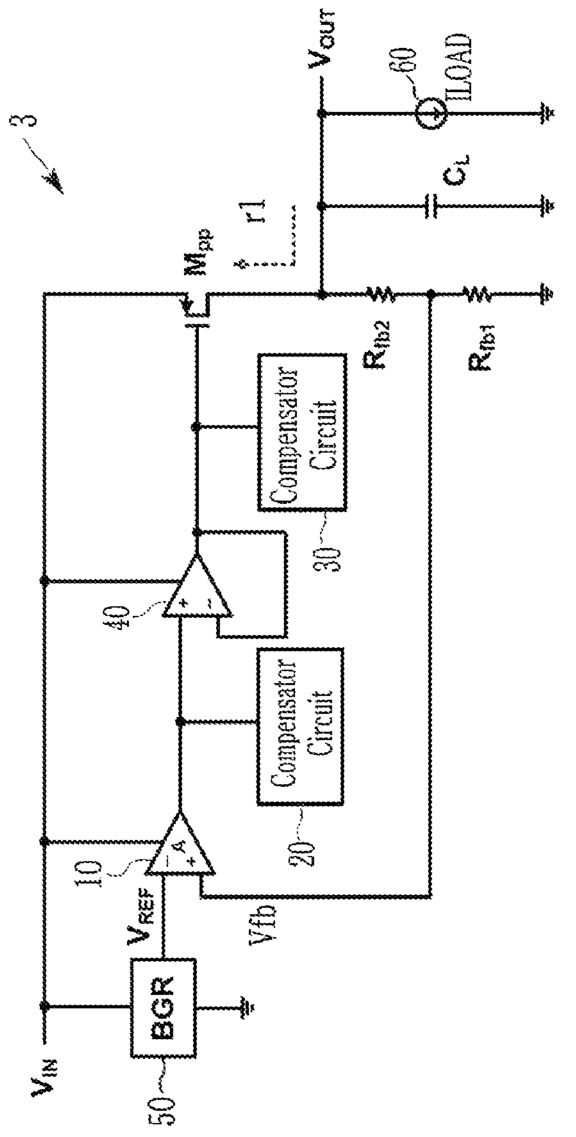
FIG. 6 is a circuit diagram illustrating a regulator in accordance with an embodiment of the present invention.

FIG. 6 is a circuit diagram illustrating a regulator in accordance with an embodiment of the present invention.

The LDO linear regulator 3 may be realized as an LDO linear regulator having a structure in which an external capacitor CL is included in an output terminal in order to supply a stable output voltage VOUT to the output terminal. The LDO linear regulator 3 may supply an input voltage VIN to a load 60 as an output voltage VOUT through a pass transistor $M_{pp}$.

The LDO linear regulator 3 may include a pass transistor $M_{pp}$, feedback resistors Rfb1 and Rfb2, an external capacitor CL, an error amplifier 10, compensation circuits 20 and 30, a buffer 40, and a bandgap circuit 50.

The pass transistor $M_{pp}$ may be connected between an input terminal and an output terminal.

The bandgap circuit 50 may generate a reference voltage VREF and supply the reference voltage VREF to an inverting terminal (−) of the error amplifier 10.

The feedback resistors Rfb1 and Rfb2 may be connected in series between the output terminal and a ground to generate a feedback voltage Vfb dividing the output voltage $V_{OUT}$. The external capacitor CL and a load 2 may also be connected between the output terminal and the ground. The current supplied to the load 2 may be the load current ILOAD.

The error amplifier 10 may amplify and output the difference between the feedback voltage Vfb and the reference voltage VREF. The output of the error amplifier 10 may be supplied to the gate of the pass transistor $M_{pp}$ through the buffer 40.

The LDO linear regulator 3 may be provided with a compensation method and a compensation circuit based on a current source which is in proportion to the load current to perform a stable voltage output in a high load current condition. To be specific, the LDO linear regulator 3 may include a compensation circuit 20 connected to the output node of the error amplifier 10, and a compensation circuit 30 connected to a gate node of the pass transistor $M_{pp}$.

The compensation circuit 20 may drive such that the equivalent resistance of the output node of the error amplifier 10 or the input node of a buffer 40 is in inverse proportion to the load current, and the compensation circuit 30 may drive such that the equivalent resistance of the gate node of the pass transistor $M_{pp}$ or the output node of the buffer 40 is in inverse proportion to the load current.

According to the driving of the compensation circuits 20 and 30, the frequency of the poles including the dominant pole may increase in proportion to the increase of the load current so that the phase margin is maintained at a constant level from the low load current to the high load current on the Bode diagram. In this way, even at a high load current, the LDO linear regulator 3 may stably output a voltage.

Figure 7:
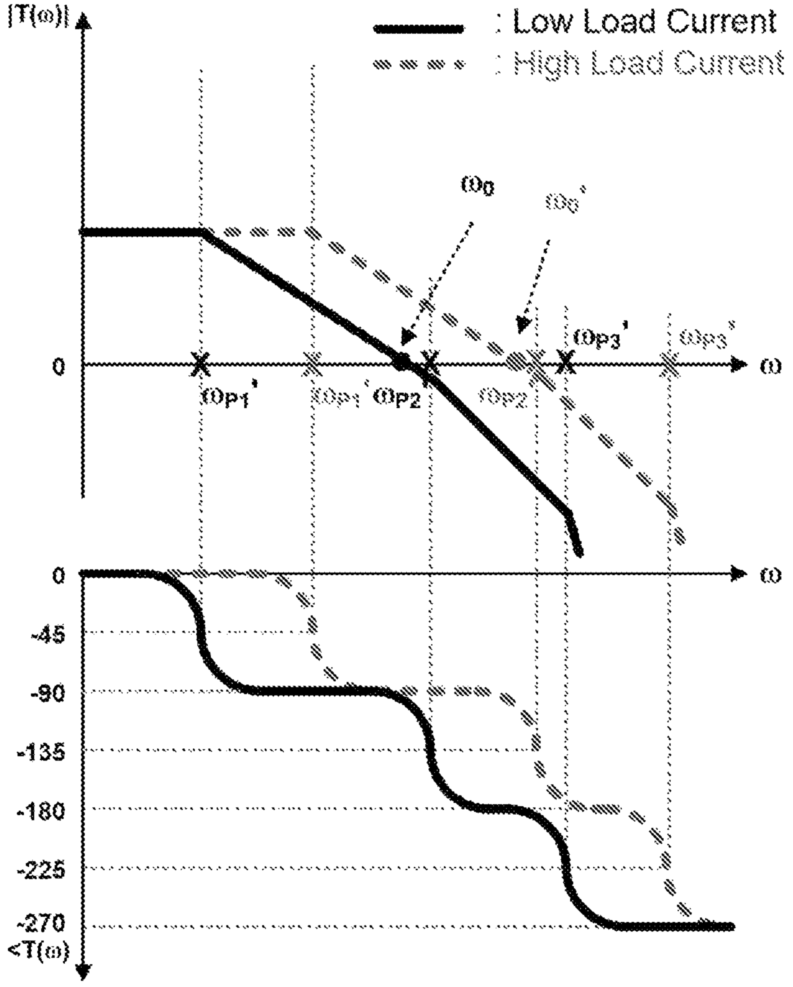
FIG. 7 is a Bode diagram based on a load current of a regulator in accordance with an embodiment of the present invention.

FIG. 7 is a Bode diagram based on the load current of the regulator in accordance with an embodiment of the present invention.

Referring to FIG. 7, since the dominant pole $\omega_{p1}'$ and the two poles ($\omega_{p2}'$, $\omega_{p3}'$) have a proportional relationship with respect to the magnitude of the load current, the same phase margin for the change of the load current may be maintained, and stable output may be maintained in response to a change in the load current.

In order for the LDO linear regulator 3 to operate stably at a high load current, compensation for each pole is required. Since the change in the dominant pole with respect to the change in the load current causes unstable operation of the circuit, compensation for the dominant pole will be described first.

Since the capacitor CL having a large capacitance value is connected to the output node for a stable output voltage VOUT, the equivalent capacitance of the output node may be approximated to the load capacitance. The equivalent resistance of the output node may be derived from the parallel connection of the feedback resistors Rfb1 and Rfb2 and a ro resistance $r_{opp}$ of the pass transistor $M_{pp}$. Since the feedback resistors Rfb1 and Rfb2 use relatively large resistances to reduce leakage current, the equivalent resistance of the output node may be set to the ro resistance $r_o$. Since the ro resistance $r_o$ is in inverse proportion to the load current, the dominant pole may move to a high frequency with respect to an increase in the load current, as shown in Equation 1 below.

$$\omega_{p1}' = \frac{1}{r_o C_L} \qquad \text{[Equation 1]}$$

Since the dominant pole changes in proportion to the change in the load current, the positions of the two poles $\omega_{p2}'$ and $\omega_{p3}'$ may also have to be in proportion to the change in the load current in order to maintain the phase margin and the stability of the loop. The compensation circuit 20 may move the pole $\omega_{p2}'$, and the compensation circuit 30 may move the pole $\omega_{p3}'$ to a higher frequency in proportion to the change in the load current.

Figure 8:
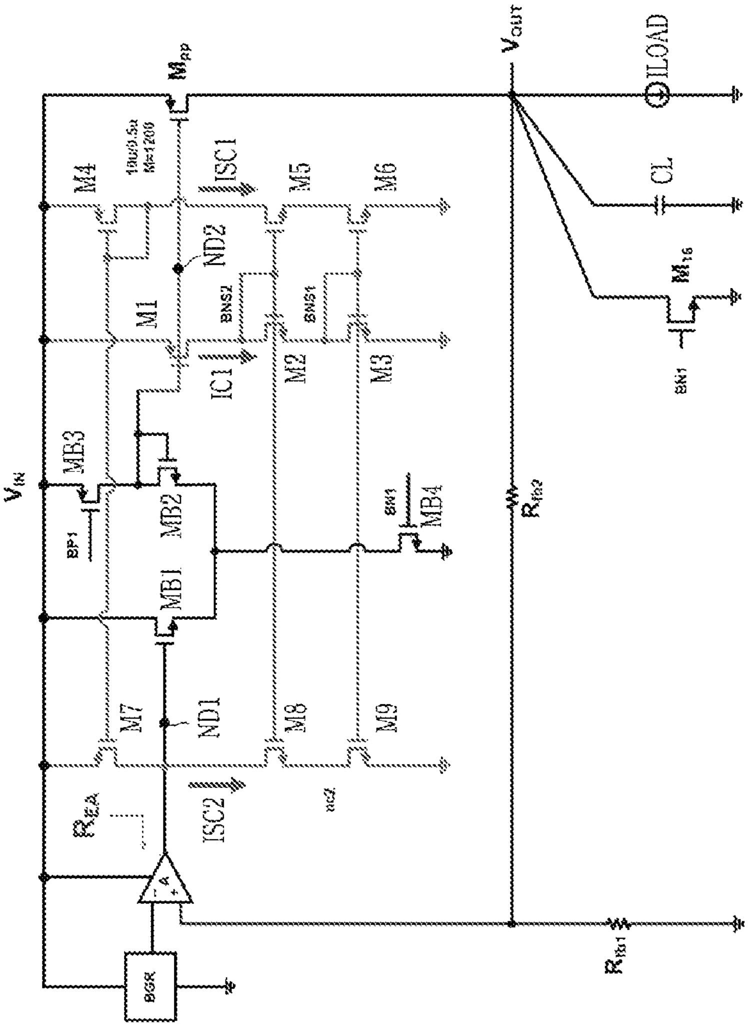
FIG. 8 is a circuit diagram illustrating a compensation circuit connected to an output terminal of an error amplifier in accordance with an embodiment of the present invention.

FIG. 8 is a circuit diagram illustrating a compensation circuit connected to an output terminal of an error amplifier in accordance with an embodiment of the present invention.

The buffer 40 may include four transistors MB1 to MB4 as a differential input buffer.

A drain of the transistor MB1 may be connected to an input voltage VIN, and a gate of the transistor MB1 may be connected to a node ND1, which is a first input terminal of the buffer 40. A bias voltage BP1 may be applied to a gate of the transistor MB3, and a source of the transistor MB3 may be connected to the input voltage VIN, and a drain of the transistor MB3 may be connected to an output terminal of the buffer 40. A gate and a drain of the transistor MB2 may be connected to an output terminal of the buffer 40 and a node ND2, which is a second input terminal of the buffer 40. The drain of the transistor MB4 may be connected to the sources of the transistors MB1 and MB2, and a bias voltage BN1 may be applied to the gate.

A bias voltage BN1 may be supplied to the gate of the transistor M16 connected to the output terminal, and a very small current may flow so that the pass transistor $M_{pp}$ is not turned off.

Referring to FIG. 8, the compensation circuit 20 may be realized with nine transistors M1 to M9. The compensation circuit 20 shown in FIG. 8 is a mere example and it may be replaced with another circuit with the same function.

The source of the transistor M1 may be connected to the input voltage VIN, and the gate of the transistor M1 may be connected to the gate of the pass transistor $M_{pp}$ in order to monitor the current flowing in the pass transistor $M_{pp}$ and to have the monitored current IC1 flow.

The drain of the transistor M2 may be connected to the drain of the transistor M1, and the drain of the transistor M3 may be connected to the source of the transistor M2, and the drain and gate of the transistor M2 may be connected to each other (diode-connection), and the drain and gate of the transistor M3 may be connected to each other (diode-connection).

The source of the transistor M4 may be connected to the input voltage VIN, and the gate and the drain may be connected to each other (diode-connection). The drain of the transistor M5 may be connected to the drain of the transistor M4, and the gate of the transistor M5 may be connected to the gate of the transistor M2. The gate of the transistor M6 may be connected to the gate of the transistor M3, and the drain of the transistor M6 may be connected to the source of the transistor M5.

The source of the transistor M7 may be connected to the input voltage VIN, and the gate may be connected to the gate of the transistor M4. The drain of the transistor M8 may be connected to the drain of the transistor M7, and the gate of the transistor M8 may be connected to the gate of the transistor M2. The gate of the transistor M9 may be connected to the gate of the transistor M3, and the drain of the transistor M9 may be connected to the source of the transistor M8.

The transistors M5 and M6 and the transistors M8 and M9 may form a current mirror circuit together with the transistors M2 and M3, and the current IC1 may be mirrored at a predetermined rate through the current mirror circuit, and a current ISC1 may flow through the transistor M5 and M6, and a current ISC2 may flow through the transistors M8 and M9. Since the current ISC1 flows through the transistors M5 and M6, the current ISC1 may also flow through the transistor M4, and the current ISC2 may flow through the transistor M4 and the transistor M7 forming the current mirror circuit. Accordingly, the current ISC2 may flow through the output node ND1 of the error amplifier 10, and the equivalent resistance of the output node ND1 of the error amplifier 10 including the compensation circuit 20 may be obtained as shown in Equation 2.

$$R_{ND1}=(R_{EA})\|(r_1)\|(g_{m1}r_2r_3) \qquad \text{Equation 2}$$

In the above equation, $R_{EA}$ may be the output resistance of the error amplifier 10; r1 may be the output resistance seen toward the drain of the transistor M7; and gm1, r2 and r3 may be the output resistances seen toward the drain of the transistor M8. When the load current is large enough, r1 may become much smaller than other resistive components so it may be simplified to $R_{ND1}$=r1.

Also, when the sum of the capacitor components of the output node ND1 of the error amplifier 10 is expressed as $C_{ND1}$, the pole $\omega_{p2}$' at the output node of the error amplifier 10 may be expressed as shown in Equation 3.

$$\omega_{p2}' = \frac{1}{r_1 C_{ND1}}$$

Since CND1 is constant with respect to the changes in the load current, the position of the pole may be determined based on r1, and since the pole $\omega_{p.ND1}$ is in inverse proportion to the output resistance r1, the frequency of the pole $\omega_{p.ND2}$ may be in proportion to the load current.

Figure 9:
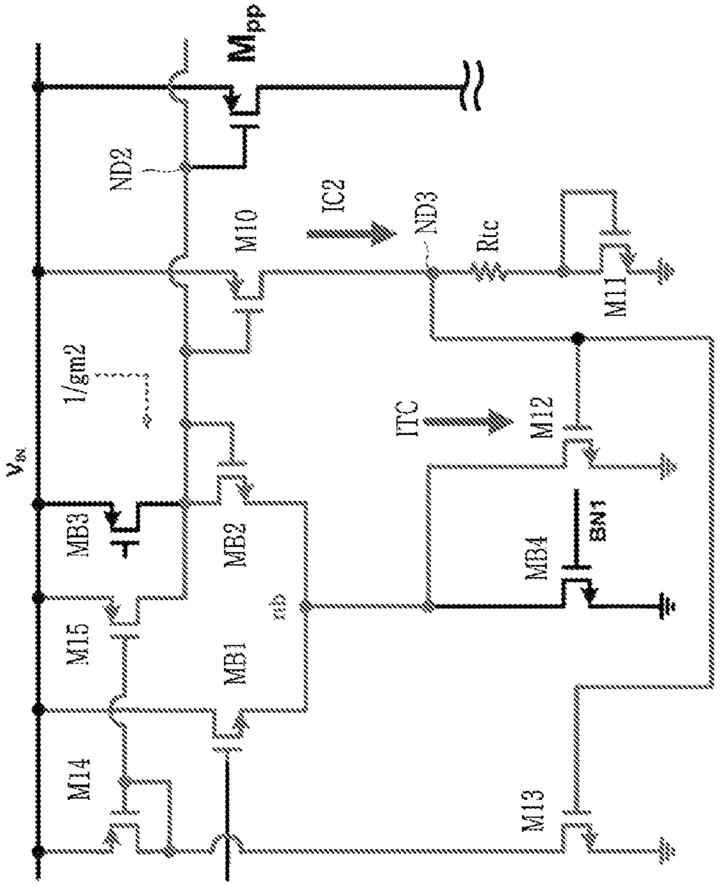
FIG. 9 is a circuit diagram illustrating a compensation circuit connected to an output terminal of an error amplifier in accordance with an embodiment of the present invention.

FIG. 9 is a circuit diagram illustrating a compensation circuit connected to an output terminal of an error amplifier in accordance with an embodiment of the present invention.

Referring to FIG. 9, the compensation circuit 30 may be realized with a resistor Rtc and six transistors M10 to M15. The compensation circuit 30 shown in FIG. 9 may be a mere example and it may be replaced with another circuit that performs the same function.

The source of the transistor M10 may be connected to the input voltage VIN, and the gate of the transistor M10 may be connected to the gate of the pass transistor $M_{pp}$ in order to monitor the current flowing through the pass transistor $M_{pp}$ and have the monitored current IC2 flow.

One end of the resistor Rtc may be connected to the drain of the transistor M10, and the drain of the transistor M11 may be connected to another end of the resistor Rtc, and the drain and gate of the transistor M11 may be connected to each other (diode-connection).

The gate of the transistor M12 may be connected to one end of the resistor Rtc, and the transistor M12 may be connected in parallel to the transistor MB4. The gate of the transistor M13 may be connected to one end of the resistor Rtc, and the drain of the transistor M13 may be connected to the drain of the transistor M14. The source of the transistor M14 may be connected to the input voltage VIN, and the gate and the drain of the transistor M14 may be connected to each other (diode-connection), and the gate of the transistor M15 may be connected to the gate of the transistor M14 so as to form a current mirror circuit.

Compensation at the output node of the buffer 40 may be performed by the compensation circuit 30 shown in FIG. 9. The transistor M10 may generate the current IC2 by monitoring the current flowing through the pass transistor $M_{pp}$, and the current IC2 may flow through the resistor Rtc and the diode-connected transistor M11. Based on the current IC2 flowing through the resistor Rtc and the transistor M11, a voltage $V_{ND3}$ at the node ND3 may be expressed as Equation 4.

$$V_{ND3} = IC2\ R_{tc} + V_{THN} + \sqrt{\frac{2IC2}{\beta}} \qquad \text{Equation 4}$$

β may be a transconductance parameter of the transistor M11, and $$\sqrt{\frac{2IC2}{\beta}}$$

may be a relatively small value, so it may be ignored. VTHN may be a threshold voltage of the transistor M11.

The voltage $V_{ND3}$ of the node ND3 may be supplied to the gate of the transistor M12, and the transistor M12 may be connected in parallel to a bias current source of the buffer 40, that is, the transistor MB4. A current proportional to the square of the current IC2 may be generated in the transistor M12. Accordingly, a current proportional to the square of the current IC2 may be additionally supplied to the buffer 40. The current ITC flowing through the transistor M12 may be expressed as the following Equation 5.

$$ITC = \frac{1}{2}\beta_{12}(V_{ND3} - V_{THN})^2 = \frac{1}{2}\beta_{12}(IC2 * Rtc)^2 \qquad \text{[Equation 5]}$$

$\beta_{12}$ may be a transconductance parameter of the transistor M12, and $V_{THN}$ may be a threshold voltage of the transistor M12. When analyzing the current flowing through the transistor M12, the current of the bias current source of the buffer 40 may be excluded. The current of the bias current source of the buffer 40 may be very low compared to the high load current, so it may be excluded from the calculation of the current ITC.

The equivalent resistance RB of the output terminal of the buffer 40 may be obtained from the transconductance gm2 of the input transistor MB2, and when the sum of the capacitor components at the output terminal of the buffer 40 is represented by CB, the pole $\omega_{p3}$' at the output node of the buffer 40 may be obtained as shown in Equation 6.

$$\omega_{p3}' = \frac{1}{RB * CB} = \frac{gm2}{CB} \qquad \text{Equation 6}$$

The gm2 of the input transistor MB2 of the buffer 40, which is a differential input buffer, may be summarized as an equation with respect to the current of the transistor MB2, and it may be in a relationship proportional to the load current. This may be expressed as the following Equation 7.

$$gm2 = \sqrt{2\beta_{MB2}(ITC/2)} = \sqrt{\beta_{MB2} \cdot \frac{1}{2}\beta_{12}(IC2 * Rtc)^2} = \sqrt{(\beta_{MB2}\beta_{12})/2} \cdot (IC2 * Rtc) \qquad \text{Equation 7}$$

Since the capacitance CB of the output node of the buffer 40 is dominated by the gate capacitance of the pass transistor $M_{pp}$, it may be fixed with respect to the changes in the load current. Therefore, the frequency of the pole $\omega_{p3}$' may be in proportion to the change in the load current, and the position of the pole $\omega_{p3}$' may depend on the load current.

As can be seen from the circuit analysis above, in the proposed circuit, both of the dominant pole and the two poles may have positions proportional to the magnitude of the load current. This may cover the shortcomings of the conventional LDO regulators that perform unstable operations with respect to the increasing load current. The LDO linear regulator according to an embodiment of the present invention may stably operate even at a high load current.

Figure 10:
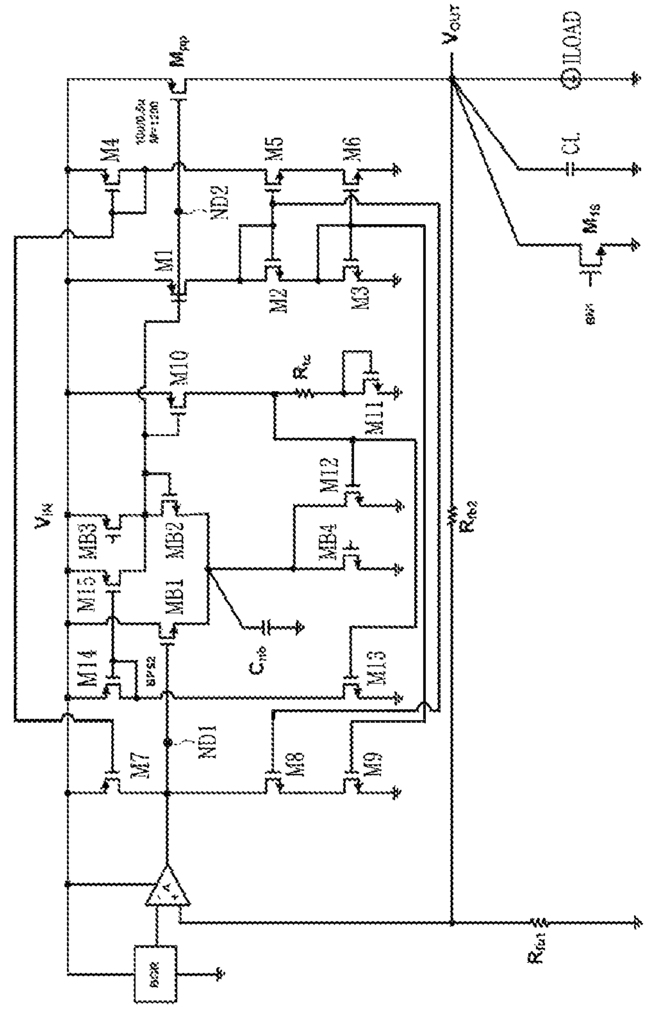
FIG. 10 is a circuit diagram illustrating an LDO linear regulator including two compensation circuits in accordance with an embodiment of the present invention.

FIG. 10 is a circuit diagram illustrating an LDO linear regulator including two compensation circuits in accordance with an embodiment of the present invention.

Figure 11:
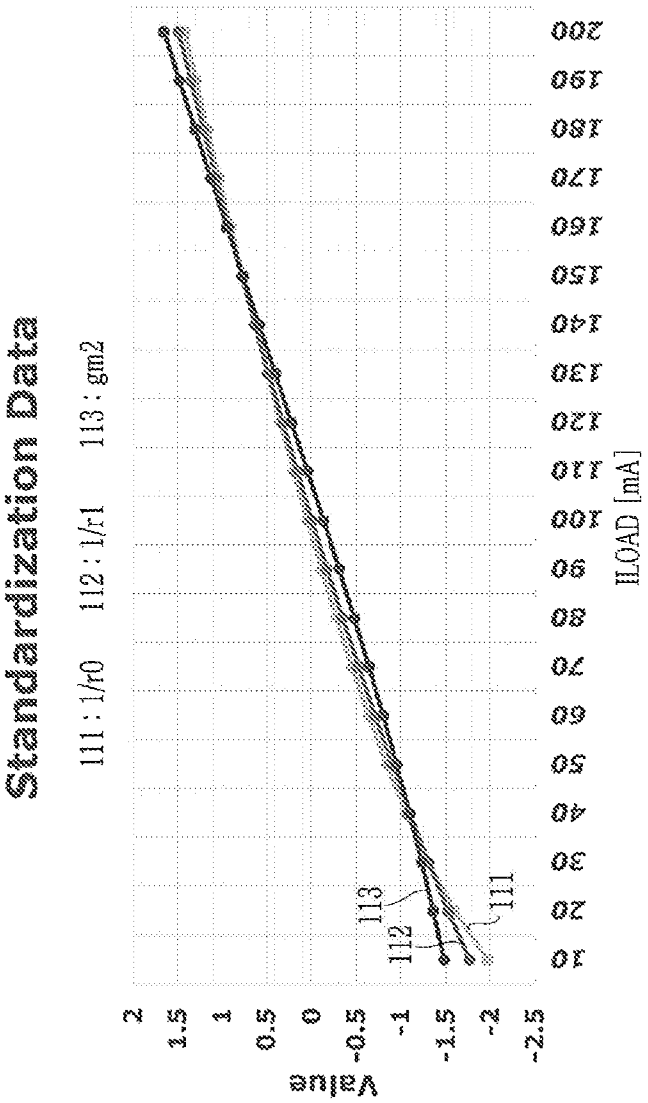
FIG. 11 is a graph showing an inverse number of the equivalent resistance component for each pole as the load current increases in accordance with an embodiment of the present invention.

FIG. 11 is a graph showing an inverse number of the equivalent resistance component for each pole as the load current increases in accordance with an embodiment of the present invention.

Referring to FIG. 11, the inverse number of each equivalent resistance component is standardized. It may be seen that the inverse number (1/ro, 1/r1, and gm2) of each equivalent resistance component changes in proportion to the load current.

Figure 12:
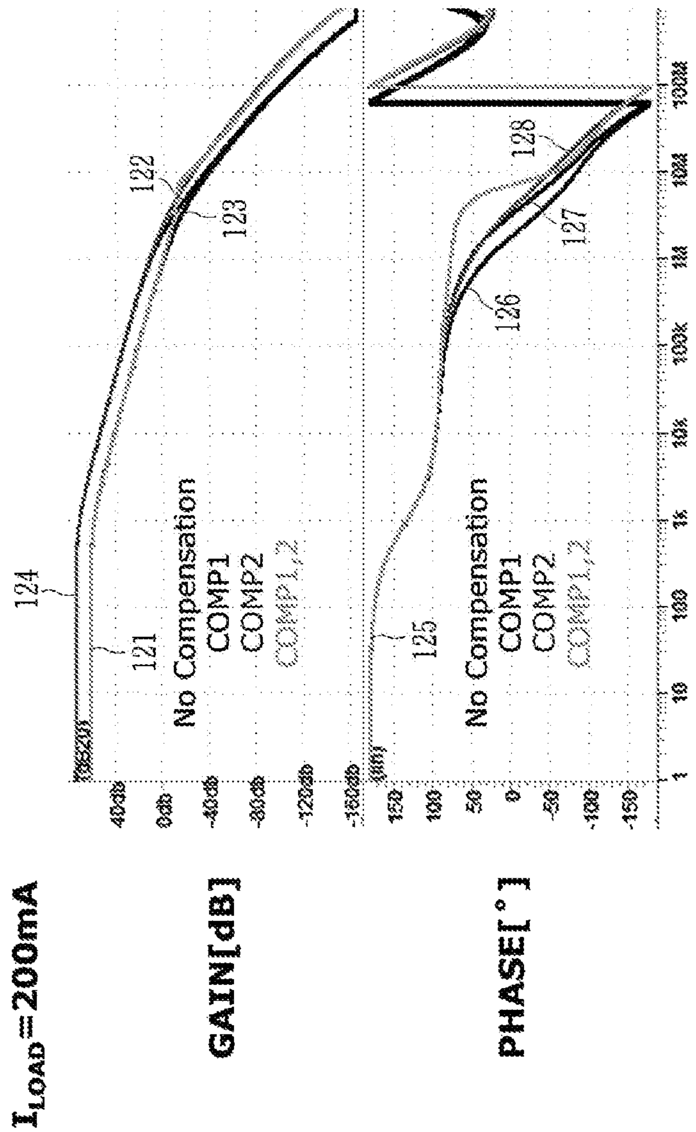
FIG. 12 is a simulation result of a loop gain and a phase at a load current of 200 mA for an LDO linear regulator in accordance with an embodiment of the present invention.

FIG. 12 is a simulation result of a loop gain and a phase at a load current of approximately 200 mA for an LDO linear regulator in accordance with an embodiment of the present invention.

Referring to FIG. 12, when both of the compensation circuits 20 and 30 are provided, the phase margin may be approximately 76.5°, which is greater than a case of the prior art (No Compensation) without a compensation circuit, a case where there is only the compensation circuit 20 (COMP1), and a case where there is only the compensation circuit 30 (COMP2). Accordingly, it may be seen that the LDO linear regulator 3 operates stably even at a high load current (approximately 200 mA).

Figure 13A:
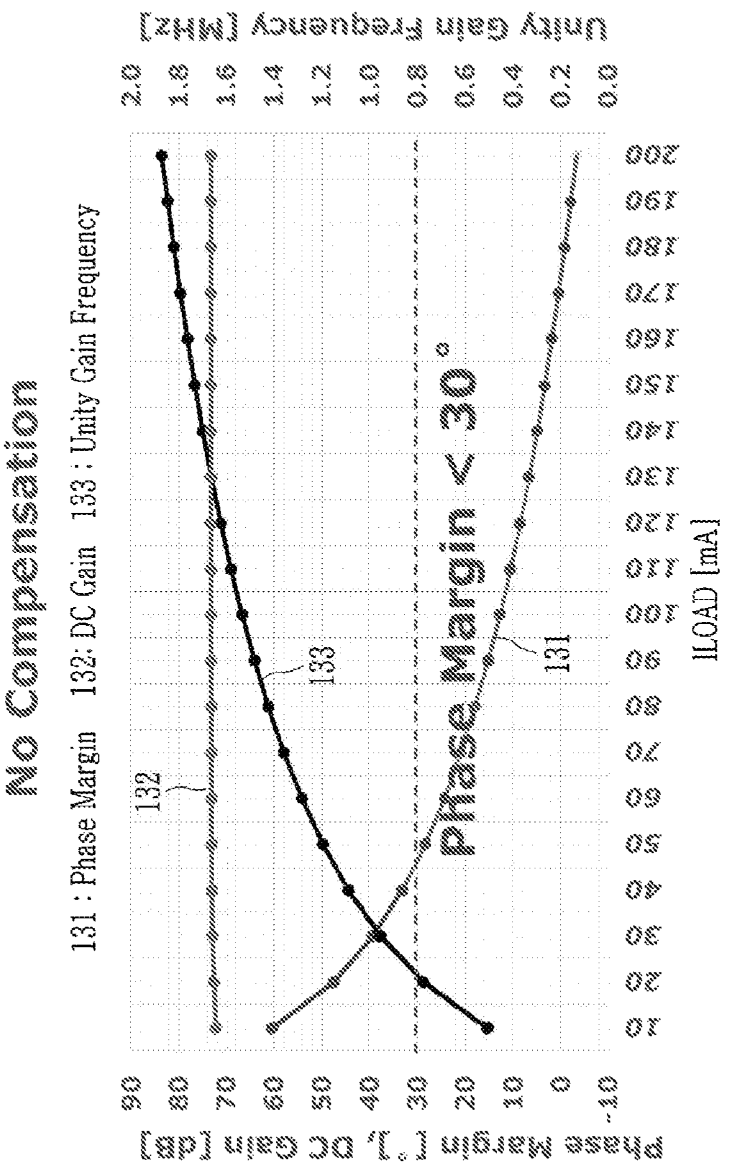
FIG. 13A is a simulation result of a phase margin, a DC gain, and a unity gain frequency of a conventional LDO linear regulator that does not include a compensation circuit.

FIG. 13A is a simulation result of a phase margin, a DC gain, and a unity gain frequency of a conventional LDO linear regulator that does not include a compensation circuit.

Figure 13B:
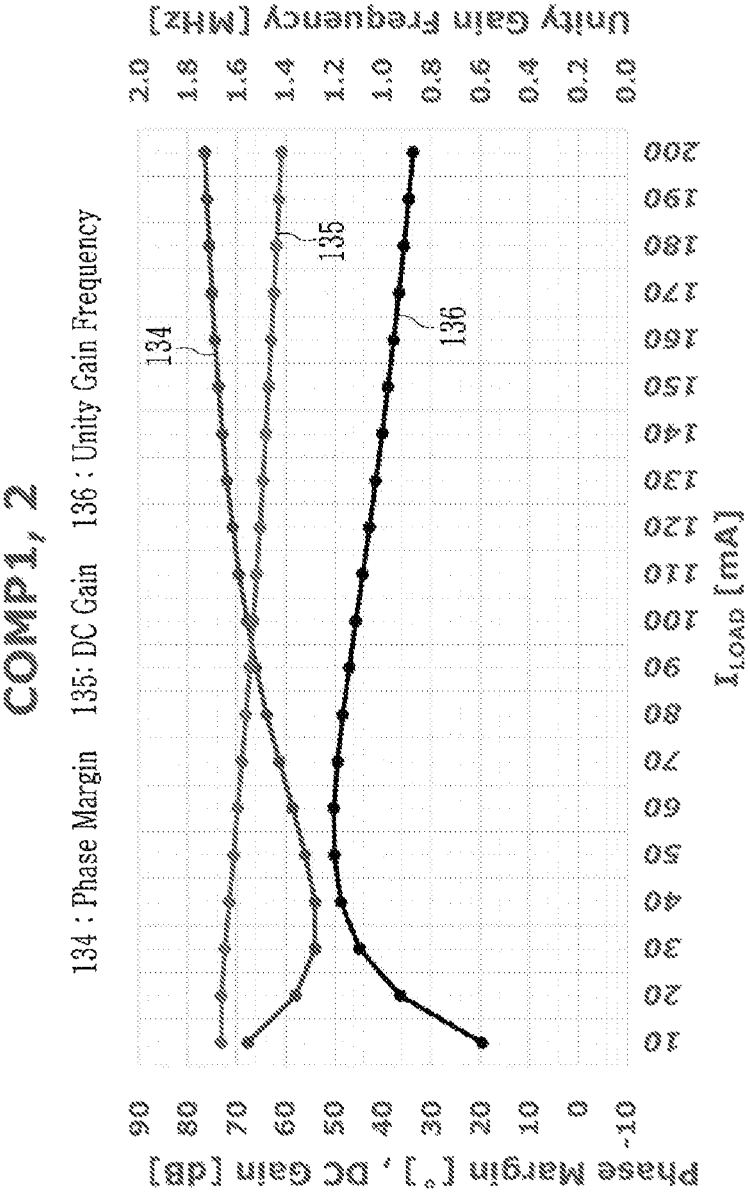
FIG. 13B is a simulation result of a phase margin, a DC gain, and a unity gain frequency according to a load current of an LDO linear regulator in accordance with an embodiment of the present invention.

FIG. 13B is a simulation result of a phase margin, a DC gain, and a unity gain frequency according to a load current of an LDO linear regulator in accordance with an embodiment of the present invention.

Referring to FIG. 13A, in the conventional linear regulator, the phase margin may decrease as the load current ILOAD increases. Considering the phase margin of approximately 30° as the minimum margin in a transient response, the maximum load current of the conventional linear regulator may be approximately 40 mA.

Referring to FIG. 13B, the LDO linear regulator according to the embodiment of the present invention may maintain a phase margin of approximately 30° or more with respect to the load current. In a section where the load current is approximately 40 mA or less, the phase margin may tend to decrease according to the load current, but since the load current of approximately 40° or less is a low load current, there may be little problem with the transient response. Since the phase margin of the transient response of the LDO linear regulator is practically approximately 30° or more even in that range, the transient response of the LDO linear regulator may not be a problem.

The present invention improves the unstable operation of a conventional LDO linear regulator including an external capacitor at a high driving current. In a LDO linear regulator including a buffer, the dominant pole and the two poles may be in proportion to the increase in the load current by adding two compensation circuits to the node corresponding to the poles. Accordingly, it may have a phase margin that does not change with respect to a change in the load current. Thus, a stable voltage output operation may be performed even at a high load current.

According to the embodiment of the present invention, a low drop-out (LDO) linear regulator may be able to provide a stable power supply operation even at a high load current.

The effects desired to be obtained in the embodiments of the present invention are not limited to the effects mentioned above, and other effects not mentioned above may also be clearly understood by those of ordinary skill in the art to which the present invention pertains from the description below.

While the present invention has been described with respect to the specific embodiments, it will be apparent to those skilled in the art that various changes and modifications may be made without departing from the spirit and scope of the invention as defined in the following claims.

What is claimed is:

1. A low drop-out (LDO) linear regulator, comprising:

a pass transistor coupled between an input terminal and an output terminal;

an error amplifier suitable for amplifying and outputting a difference between a feedback voltage corresponding to an output voltage of the output terminal and a predetermined reference voltage;

a buffer including an input terminal which is coupled to an output node of the error amplifier and an output terminal which is coupled to a gate of the pass transistor;

a first compensation circuit suitable for driving an equivalent resistance of the output node of the error amplifier to be in inverse proportion to a load current; and a second compensation circuit suitable for driving an equivalent resistance of an output node of the buffer to be in inverse proportion to the load current, wherein second compensation circuit includes a transistor which is coupled in parallel to a bias current source of the buffer so as to supply a current proportional to a square of the load current to the bias current source of the buffer.

2. The LDO linear regulator of claim 1, wherein the first compensation circuit includes:

a first transistor having a gate which is coupled to the gate of the pass transistor and having a first current corresponding to the load current flow therethrough;

a current mirror circuit coupled to the first transistor and suitable for generating a second current by mirroring the first current; and a second transistor including one end which is coupled to the output node of the error amplifier, and having the second current flow therethrough.

3. The LDO linear regulator of claim 2, wherein the current mirror circuit includes:

a third transistor which is diode-coupled and has the first current flow therethrough; and a fourth transistor including a gate which is coupled to a gate of the third transistor and one end which is coupled to the output node of the error amplifier, and having the second current flow therethrough.

4. The LDO linear regulator of claim 3, wherein the first compensation circuit further includes:

a fifth transistor including a gate which is coupled to the gate of the second transistor; and a sixth transistor coupled to one end of the fifth transistor and diode-coupled, wherein the gate of the third transistor is coupled to a gate of the sixth transistor.

5. The LDO linear regulator of claim 4, wherein the first compensation circuit further includes:

a seventh transistor coupled to the third transistor to have the first current flow therethrough, and diode-coupled; and an eighth transistor including a gate which is coupled to a gate of the seventh transistor and one end which is coupled to another end of the fourth transistor.

6. The LDO linear regulator of claim 5, wherein the first compensation circuit further includes:

a ninth transistor including a gate which is coupled to the gate of the sixth transistor and one end which is coupled to another end of the fifth transistor.

7. The LDO linear regulator of claim 1, wherein the second compensation circuit includes:

a first transistor having a gate which is coupled to the gate of the pass transistor, and having a first current corresponding to the load current flow therethrough;

a resistor including one end which is coupled to one end of the first transistor, and having the first current flow therethrough;

a second transistor including one end which is coupled to another end of the resistor, and diode-coupled; and the transistor including a gate which is coupled to one end of the resistor, and coupled in parallel to the bias current source of the buffer.

8. The LDO linear regulator of claim 7, wherein the second compensation circuit includes:

a fourth transistor having a gate which is coupled to one end of the resistor;

a fifth transistor having one end which is coupled to one end of the fourth transistor, and diode-coupled; and a sixth transistor having a gate which is coupled to a gate of the fifth transistor and one end which is coupled to the output node of the buffer.

9. An LDO linear regulator, comprising:

a pass transistor coupled between an input terminal and an output terminal;

an error amplifier suitable for amplifying and outputting a difference between a feedback voltage corresponding to an output voltage of the output terminal and a predetermined reference voltage;

a buffer coupled between the error amplifier and the pass transistor;

a first compensation circuit coupled to an output node of the error amplifier and including a first transistor having a resistance which is in inverse proportion to a load current; and a second compensation circuit including a second transistor which is coupled in parallel to a bias current source of the buffer so as to supply a current proportional to a square of the load current to the bias current source of the buffer, wherein an equivalent resistance of an output node of the buffer is in inverse proportion to the load current based on a current flowing through the second transistor.

10. The LDO linear regulator of claim 9, wherein the load current is mirrored through a current mirror circuit which is coupled to the first transistor and flows through the first transistor, and a gate voltage of the second transistor changes based on the load current.

* * * * *